United States Patent [19]

Goldman et al.

[11] Patent Number: 5,330,652
[45] Date of Patent: Jul. 19, 1994

[54] FLUIDIZED BED REACTOR AND DISTRIBUTION SYSTEM

[75] Inventors: Joshua N. Goldman, Montague; John R. Rosenau, Amherst, both of Mass.

[73] Assignee: Aquafuture, Inc., Turners Falls, Mass.

[21] Appl. No.: 23,323

[22] Filed: Feb. 26, 1993

[51] Int. Cl.⁵ .................................................. C02F 3/06
[52] U.S. Cl. .................................. 210/618; 210/807; 210/150; 210/268
[58] Field of Search ............... 210/150, 151, 268, 279, 210/291, 792, 807, 617, 618

[56] References Cited

U.S. PATENT DOCUMENTS

| | | | |
|---|---|---|---|
| 3,846,289 | 7/1972 | Jeris et al. | 210/618 |
| 3,968,034 | 7/1976 | Jymoszczak | 210/151 |
| 4,076,616 | 2/1978 | Verde | 210/618 |
| 4,113,613 | 9/1978 | Sekowlov et al. | 210/618 |
| 4,141,824 | 2/1979 | Smith | 210/618 |
| 4,306,757 | 7/1977 | Peasley | 210/279 |
| 4,364,830 | 12/1982 | Roberts | 210/268 |
| 4,391,703 | 5/1983 | Crosby | 210/151 |
| 4,460,467 | 7/1984 | Ueda | 210/279 |
| 4,482,458 | 11/1984 | Rovel et al. | 210/150 |
| 4,545,909 | 10/1985 | Atkinson et al. | 210/618 |
| 4,561,974 | 12/1985 | Bernard et al. | 210/151 |
| 4,582,609 | 4/1986 | Hunter et al. | 210/170 |
| 4,618,418 | 10/1986 | Heijen et al. | 210/151 |
| 4,702,891 | 10/1987 | Li et al. | 422/140 |
| 4,921,604 | 5/1990 | Mollenbeck | 210/151 |
| 5,037,550 | 8/1991 | Montagnon et al. | 210/618 |

FOREIGN PATENT DOCUMENTS 1436264  12/1968  Fed. Rep. of Germany .

Primary Examiner—Christopher Upton
Attorney, Agent, or Firm—Wolf, Greenfield & Sacks

[57] ABSTRACT

This invention provides a fluidized bed reactor with improved method and apparatus for inhibiting and clearing clogging of the fluid distribution network in such reactor. In particular, at least one channel or reservoir of fluid is provided over at least a selected portion of the distribution network, with fluid from such column/reserve being released to maintain flow and pressure in the distribution network as the media bed is defluidized. For the preferred embodiment, the fluid column is (a) a feed pipe connecting a fluid inlet which is above the reactor fluid level to the distribution network; and (b) a plurality of risers which, for the preferred embodiment, extend from the end of each lateral tube of the distribution network. A vacuum breaker is provided for each fluid column to permit fluid to flow from the column into the network when pressure is removed. A valve controlled opening may be provided at the top of each riser to permit purging of the distribution network through the openings when the valve is opened and to provide access to the distribution network for clearing clogs without requiring removal of the media bed.

14 Claims, 3 Drawing Sheets

FLUIDIZED BED REACTOR AND DISTRIBUTION SYSTEM

FIELD OF THE INVENTION

This invention relates to fluidized bed reactors and more particularly to an improved fluid distribution system for such reactors.

BACKGROUND OF THE INVENTION

Fluidized beds of sand, activated carbon, or other media have been used for a wide variety of aerobic and anaerobic waste treatment processes. Because of their extremely high surface areas for biological growth and high hydraulic loading rates, fluidized beds have demonstrated significant cost and performance advantages for biological treatment of industrial, process, and municipal waste water. Nevertheless, a significant number of these systems which were built over the last twenty years have become inoperable or have been subject to excessive maintenance. These operational problems can be traced to the chronic clogging of the inlet distribution system which distributes the influent at the bottom of the filter bed.

The inlet distribution system of these biological fluidized beds can become clogged for two principal reasons. First, cessation of normal flow through the filter causes intermittent fluid backflow. This condition draws the media bed into the inlet distribution system and causes clogging. The problem occurs because the media has a greater density than the fluid and therefore tends to displace the fluid in, for example, the lateral elements of the distribution plumbing. Conventional check valves which attempt to prevent this require some degree of backflow in order to activate them. They are thus ineffective in preventing clogging of the inlet system. Moreover, conventional check valves are subject to sticking when even small amounts of media become caught in them. The second, principal cause of clogging occurs when foreign materials become lodged in the laterals or openings in the distribution system and impedes normal operation.

A third factor may play a role in clogging the laterals. The flow in the laterals is turbulent. Pressure fluctuations associated with such flow conditions appear to draw media into the laterals even under normal operating conditions.

Since it is critical to maintain an even flow distribution through the system so that the bed is uniformly fluidized, even a few nozzles becoming inoperative permits the media above them to settle into a heavy dense unfluidized mass. The remaining nozzles receive more flow and, as a result, the media above them becomes even more fluidized and tends to be deposited over the dead zone, increasing its size and making the problem worse. This phenomenon of excessive fluidization and subsequent media deposition typically worsens until a major part of the bed is no longer fluidized.

Since the distribution plumbing is typically under one to several hundreds of tons of media, clearing media from the reactor to unclog even a few nozzles is a maintenance nightmare, being difficult, messy, time-consuming and expensive.

SUMMARY OF THE INVENTION

In accordance with the above, this invention provides a fluidized bed reactor for filtering fluids and a method for inhibiting the clogging of a fluid distribution network of such a reactor. More particularly, the reactor has a tank containing a media bed. The reactor also has fluid inlet to the tank, a fluid outlet from the tank and a distribution network connected to receive fluid from the inlet and having outlet ports or nozzles for the substantially even distribution of fluid through the media bed. The outlet maintains a selected fluid level in the tank, which level is above the level for the media. A means is also provided for temporarily maintaining a fluid flow through at least a portion of the distribution network after a termination in fluid flow to the distribution network from the fluid inlet.

The technique for temporarily maintaining fluid flow generally involves providing at least one fluid reserve or column, with each such reserve column being positioned over a selected portion of the distribution network. The reserve/column fluid is permitted to flow into and through at least the corresponding selected portion of the network when there is a termination in fluid flow from the inlet.

More specifically, two separate techniques are disclosed for the temporary maintenance of fluid flow, which techniques can be used individually, but are used together for the preferred embodiment. In one technique, at least one riser is provided with each riser extending substantially vertically from a selected portion of the distribution network to a height above the fluid level in the tank. Each riser is connected to receive flow fluid from the network with fluid normally rising in the riser to a level above the fluid level in the tank when there is fluid flow in the network. For the preferred embodiment, the distribution network includes a plurality of spaced lateral tubes which extend from opposite sides of a conduit connected to receive fluid from the fluid inlet. Each lateral tube has a plurality of spaced ports or nozzles for delivering fluid to the media and has at least one riser extending therefrom, the riser preferably extending from a point near the end of the lateral tube.

A valve controlled opening is preferably provided near the top of each riser. The distribution network in general, and the lateral tube connected to the riser in particular, may be purged of media material which has migrated into the tube by opening the valve, permitting fluid in the riser and in the lateral tube to gush from the resulting opening, carrying with it any media material from the lateral tube. The opening also permits access to the lateral tube and its nozzles without requiring removal of media from the tank.

A small orifice may also be provided near the top of each riser. This orifice serves a number of functions, including serving as an escape hole for trapped air so that fluid may rise in the risers, and serving as a vacuum break to permit fluid from the riser to flow back into a lateral tube. Finally, a small quantity of fluid may spray from the orifice, providing a visual indication that the riser is full.

The second way in which the flow maintaining function may be performed is for the fluid inlet to enter the tank at a level above the fluid level in the tank and to be connected to the distribution network through a substantially vertical pipe. A vacuum breaker, for example a large float valve, is provided near the fluid inlet so that, when there is an interruption in fluid flow to the inlet, the fluid in the pipe may flow into the distribution network to temporarily maintain fluid flow to the network.

The foregoing and other objects, features and advantages of the invention will be apparent from the following more particular description of a preferred embodiment of the invention as illustrated in the accompanying drawings.

DETAILED DESCRIPTION

Figure 1:
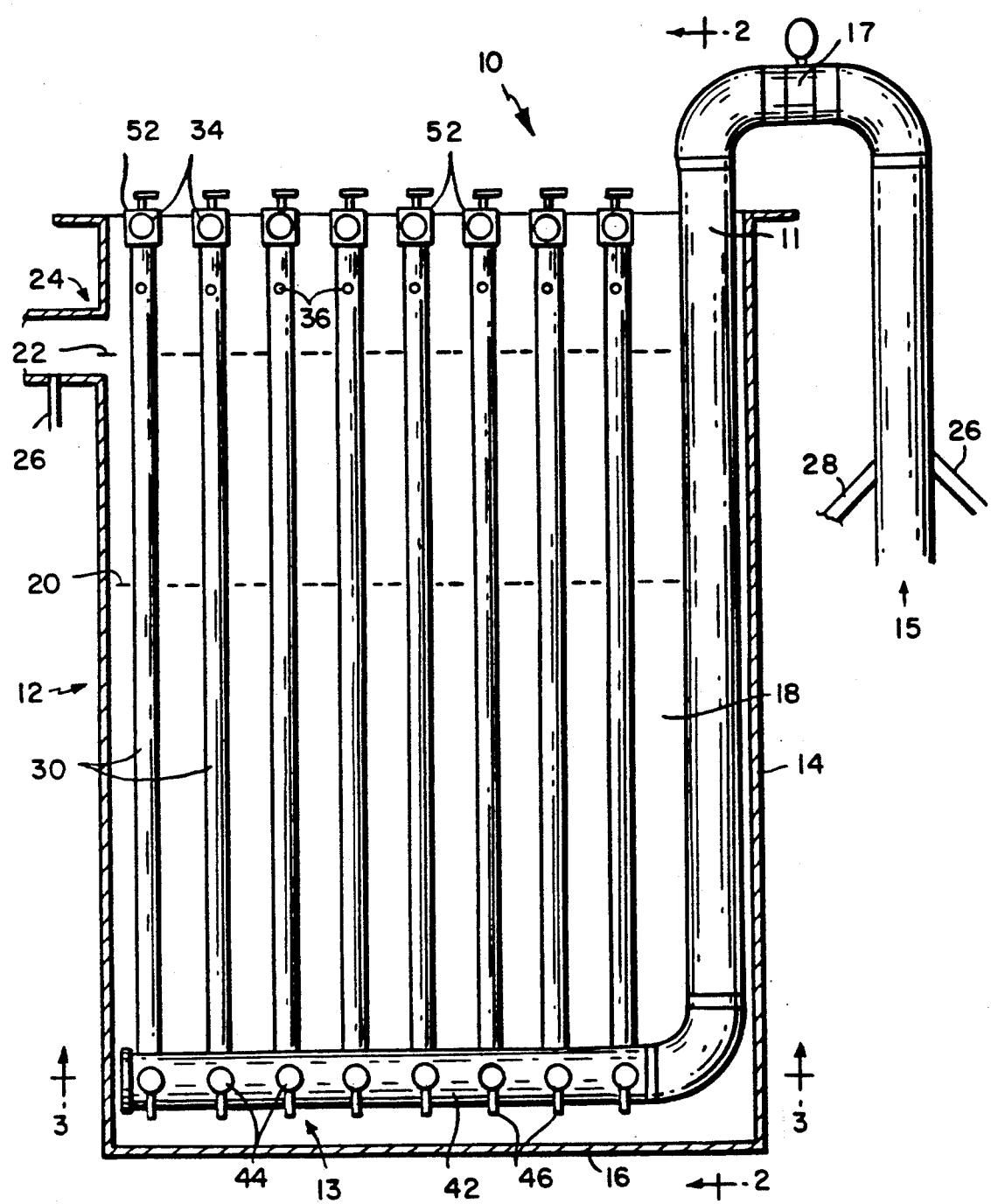
FIG. 1 is a simplified cross-sectional view of a fluidized bed reactor in accordance with a preferred embodiment of the invention.
Figure 2:
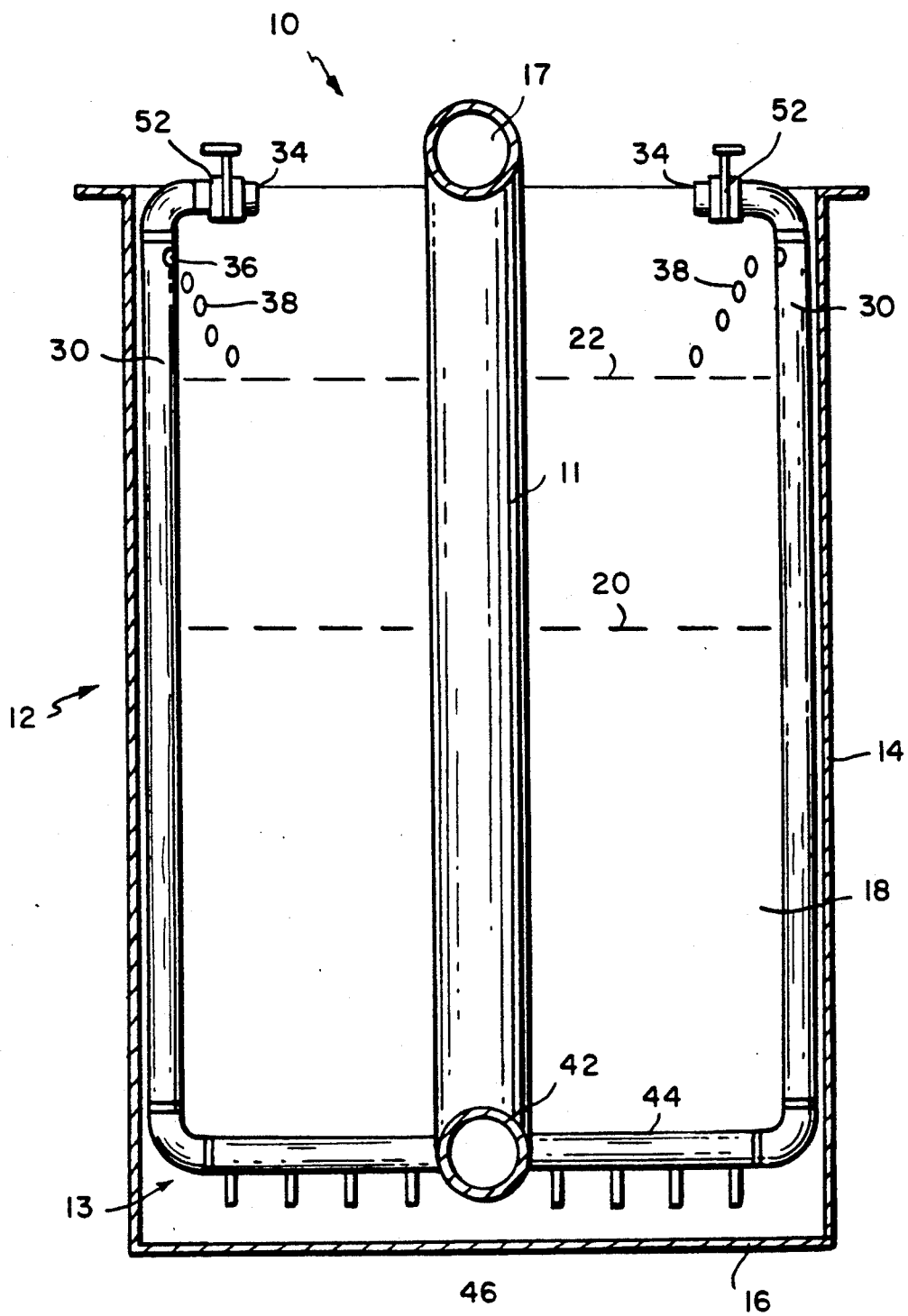
FIG. 2 is a cross-sectional view of the reactor taken generally along the line 2—2 in FIG. 1.

The fluidized bed apparatus or reactor of the invention is applicable to the removal of contaminants and other compounds or matter from a fluid such as water. Liquids from wastewater treatment plants, activated slude processes, aquaculture tanks, and fish farming ponds, are examples of waters that might be treated with the apparatus.

The fluid to be treated can contain a variety of compounds, including ammonia, amines, nitrites and nitrates. Fluids high in ammonia may be subjected to oxidation and the action of aerobic bacteria that live on the media. The reactor can also be used with denitrifying bacteria to convert oxidized nitrogen compounds, i.e., nitrates and/or nitrites) to nitrogen gas.

The "fluidized bed" refers to the flow of fluid (and the materials to be removed from it) through a bed of fine particles. The velocity of the water or other fluid is chosen to slightly expand the bed of particles (by, for example, 30%) and to impart to them a gentle movement. When in this state, the media may be referred to as being "fluidized". The microorganisms to cause the desired change in the water may come from a natural contamination or they may be deliberately added.

Referring to the Figures, a fluidized bed reactor 10 is shown which includes a reactor vessel of tank 12 having sidewalls 14 and a base 16 connecting the sidewalls. A fluid inlet pipe 15 is provided for delivering fluid to the reactor. Inlet pipe 15 preferably extends over wall 14 and into the reactor where it is jointed to a fluid delivery pipe 11 in fluid communication with a distribution network 13. A vacuum breaker/air relief valve 17 is located at the top of inlet pipe 15, at, for example, the junction of this pipe with pipe 11. Valve 17 may, for example, be a float valve which is closed when there is fluid pressure applied to inlet 15 and which opens when such fluid pressure is removed.

Figure 3:
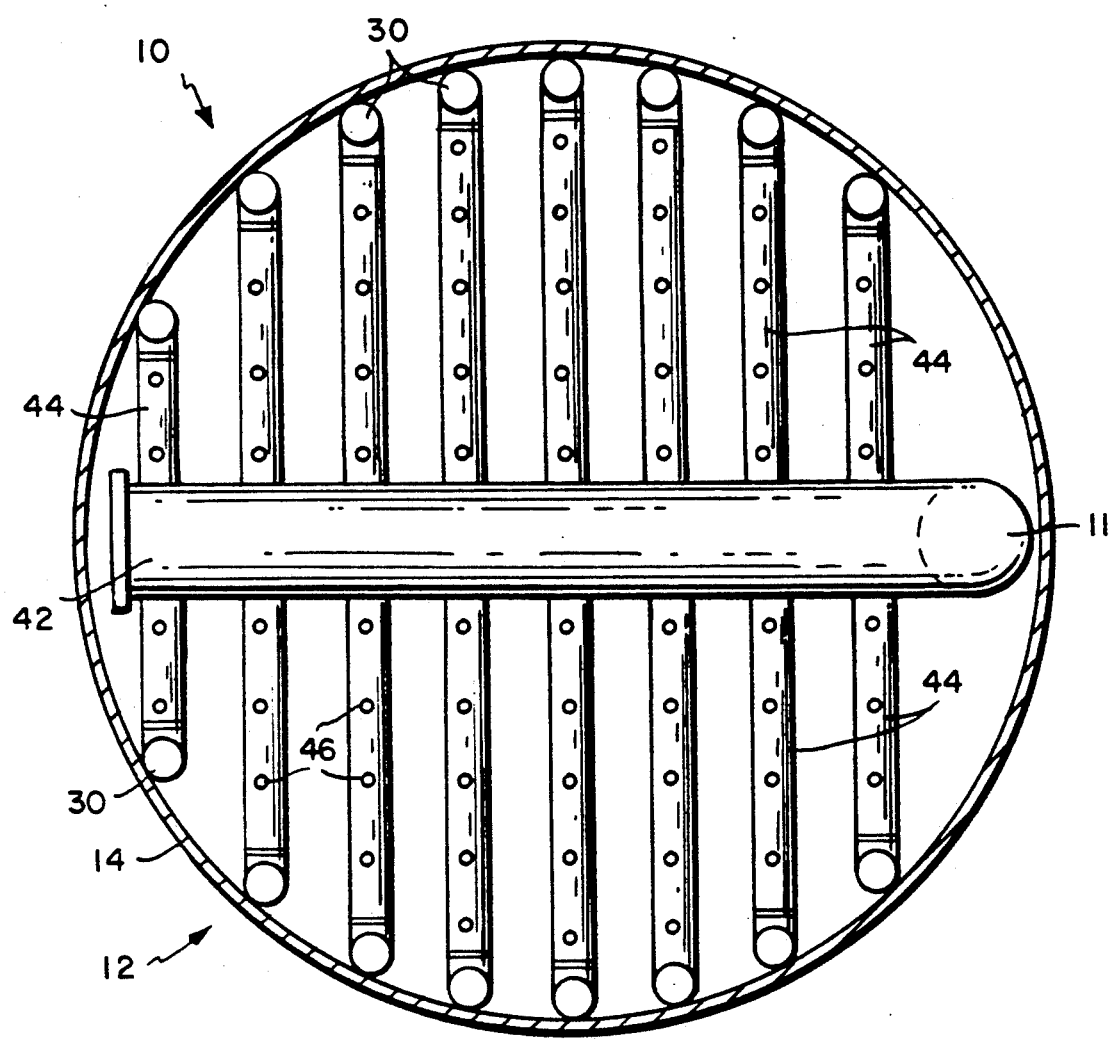
FIG. 3 is a plan cross-sectional view of the reactor taken generally along the line 3—3 in FIG. 1.

Distribution network 13 is positioned near the bottom of tank 12 and includes a horizontal main conduit 42 extending along a diameter of the tank (FIG. 3) which is connected to receive fluid from delivery pipe 11 and a plurality of horizontal or lateral tubes 44 extending at right angles from both sides of conduit 42. Each lateral tube 44 (sometimes hereinafter referred to as a lateral) has a plurality of downward-facing ports or nozzles The nozzles provide a sufficient pressure drop for uniform flow distribution through media bed 18. Since nozzles 46 are directed downward, the fluid flows down out of the nozzles. However, since the fluid cannot flow through the solid floor 16 of the tank, it reverses direction and flows up through the media bed. The desired microorganisms are normally innoculated into the system and subsequently grow on the media. As the fluid flows upward through media bed 18, it comes in intimate contact with the media and the desired filtering process is effected. As previously indicated, the velocity of the fluid is such that it expands the media bed, the expanded media bed being, for example, at the level 20. When fluid pressure is removed from the distribution network, the media bed settles back to an unexpanded condition over a period of time which is generally a few seconds.

After passing through the media bed, the fluid continues to flow upward with the filtered fluid exiting the tank through fluid outlet 24. Outlet 24 controls the fluid level 22 in the reactor, although, depending on the actual flow conditions, the steady state reactor fluid level maintained within the reactor may be at a height above that of fluid outlet 24.

Fluid is exhausted from the reactor 10 by way of outlet 24 after passage through the media bed 18. Selected portions of the exhausted fluid may be recycled through conduit 26 as required for complete filtering or to promote further growth of the biocatalyst on the media bed. An additional conduit 28 can be connected to the fluid inlet 15 to provide additional oxygen sources and/or carbon, nitrogen or other nutrients for the biocatalyst in sufficient amounts to satisfy growth and metabolism requirements of the biocatalyst. The metering of sufficient amounts of these additional sources may be conducted automatically by providing conventional nutrient and/or gas analyzers which may be adapted to periodically sample the influent fluid and determine its nutrient and/or gas content.

A plurality of tubes 30 (hereinafter referred to as "riser tubes" or "risers") are in fluid communication with the distribution network 13. These riser tubes can be located outside tank 12, although they preferably are located within the tank. Each riser tube has one end connected to the distribution system 13 and another end 34 that is located above both the fluidized media bed level 20 and the reactor fluid level 22. Upper end 34 of each riser tube is normally closed by a valve 52 and a small opening or orifice 36 is provided in the riser some distance below the closed end and above reactor fluid level 22. For a preferred embodiment, opening 36 is approximately ¼. A small quantity of fluid 38 may spray from orifice 36, indicating that the riser is full. Valve 52 may be a knife-gate valve. Upper end 34 of each riser extends over tank 12 so that when valve 52 is in an open position, fluid flows through the corresponding lateral tube 44 and riser 30 and out valve 52 into the tank.

Tank 12 can be made of a variety of materials, the material utilized preferably being inert (i.e., not chemically or physically altered) to the to the biocatalyst and inert to the particular fluid flowing through the reactor. Exemplary materials for constructing the tank and other components of the reactor include noncorrosive metals such as stainless steel, polymers such as polyvinylidene chloride, polyethylene, polytetrafluorethylene, polypropylene, fiberglass-reinforced plastic, and other materials such as concrete. Particularly preferred materials for the tank are fiberglass-reinforced plastic.

Suitable materials for the media bed include natural or artificial substances such as coal, volcanic cinders, glass or plastic beads, sand, activated carbon particles, and alumina. The size of the individual particles of the media bed are a function of both their specific gravity and surface area. For the most part, it is preferred to employ media particles of between about 0.1 to 10 mm in diameter. Most preferably, the particles are of a uniform size. While the above media bed materials are illustrative of the preferred materials which are useful, other materials inert to the biocatalyst, either natural or synthetic, can be employed.

Fluid flow through the media bed is preferably kept within a narrow range of flow rates; the range being primarily a function of the type, size and specific gravity of the media bed, type of fluid and reactor vessel size. Exemplary flow rates in the preferred embodiments should be sufficient to produce an approximately 30% expansion in volume of the media above the media bed volume at no flow.

A "biocatalyst", as defined herein, is a prokaryotic and/or eukaryotic organism, preferably a microorganism, that can convert organic and inorganic materials in the fluid to other products. For example, and not by way of limitation, biocatalysts can include nitrifying bacteria (e.g., Nitrosomonas, Nitrobacter) that can convert ammonia or amines to nitrates or nitrites. Protozoans and/or fungi are other examples of biocatalysts that can be used to perform a particular transformation. The term "biocatalyst" is also meant to include recombinantly derived microorganisms, fragments of these microorganisms, and enzymes isolated from these microorganisms. It will be understood that the exact kind and quantity of biocatalyst is not intended to limit the scope of the present invention. The biocatalyst can be introduced by the operator into the media bed as a substantially pure or mixed culture of micro-organisms. The biocatalyst can also be introduced into the media bed, and can colonize the media bed, by way of the fluid itself.

In operation, all of the valves 52 are normally closed and fluid under pressure is applied to fluid inlet 15. The fluid in inlet pipe 15 causes valve 17 to be closed. This fluid flows through pipe 11 and conduit 42 to the laterals 44. The fluid pressure is sufficient so that the fluid entering laterals 44 is passed through nozzles 46 into media bed 18 to fluidize the bed. The fluid pressure in laterals 44 also causes fluid to rise in risers 30 to the level of valves 34. While some fluid sprays from orifices 36, the orifices are small enough, being for example ¼ inch in diameter for a 4 inch diameter riser, that the orifices do not have a significant adverse affect either on the height or pressure of fluid in the risers.

The steady-state condition described above continues until there is a termination of fluid flow at inlet 15. When this occurs, fluid pressure from nozzles 46 terminates and the media 18 settles back from its fluidized to its unfluidized state over a period of time which normally takes several seconds. It has been found that since there is an absence of fluid pressure at nozzles 46 during this period while the media is still active, this is the period when media is most likely to migrate from the nozzles into laterals 44, causing a potential clogging of the nozzles and in some instances a clogging of the laterals themselves. The problems resulting from such clogging have been previously described.

Therefore, in accordance with the teachings of this invention, a mechanism has been provided for providing a temporary continuance of fluid flow and pressure at the nozzles during the defluidization period of the media to minimize the likelihood of media entering the nozzles and laterals during this period. In particular, this objective is achieved both by inlet feed tube 11 and by risers 30. More specifically, when fluid flow at inlet 15 terminates, there is a volume of fluid in pipe 11 which, depending on the length of the pipe and its diameter, may be 10 to 20 gallons. The absence of fluid in inlet pipe 15 permits vacuum break valve 17 to open, allowing air to enter pipe 11 and permitting the fluid in this pipe to flow into conduit 42 and through laterals 44 to the nozzles. The opening at vacuum release 17 and the flow resistance in distribution network 13 as a result, for example, of nozzle size will determine the rate at which fluid flows from pipe 11. These factors may be controlled so that the time period required for pipe 11 to completely empty is roughly equal to the settling time of media 18 so that fluid pressure is maintained at the nozzles during substantially the entire fluid settling time, minimizing the migration of media into the nozzles and laterals.

Similarly, when flow from inlet 15 terminates, there may also be several gallons, for example, 2 gallons, of water or other fluid in each of the risers 30. Orifices 36 serve as vacuum breakers to permit this fluid to flow back into the corresponding laterals to maintain pressure therein as the media bed settles. Again, the time it takes for fluid to flow from the riser will depend on the height of the riser above the fluid level 22 in tank 12, on the size of orifice 36 and on the back pressure from the distribution network. These factors can be selected to maintain a desired fluid pressure in network 13 until the media bed has become substantially defluidized.

A technique has thus been provided for maintaining a sufficient fluid flow in the distribution network of a fluidized bed reactor during defluidization of the reactor to minimize migration of media into the nozzles and laterals of the distribution network during this period. The apparatus of this invention also may be utilized to purge media which has migrated into the distribution network and to provide access to the network without requiting the nightmarish process of removing the media bed. In particular, the valves 54 may be periodically opened, for example once a week or once every two weeks, while fluid pressure is being applied to the system from inlet 15. Since there is some pressure in the risers against valve 52 at this time, opening of the valve permits fluid in the risers and at least in the lateral to which a riser is attached to gush from the opening 34, which may for a preferred embodiment be a relatively large opening, for example four inches, carrying any media which has migrated into the lateral with it. The fluid and media exiting end 34 of each riser are returned to tank 12.

Normally, this purge operation will remove a sufficient quantity of media which may have accumulated in a lateral 44 behind any nozzle 46 so that when valve 52 is closed, causing the lateral and nozzles to be repressurized, any remaining media at the nozzles will be forced out by the fluid pressure, completely freeing the nozzles. However, there are situations where a blockage in a lateral or the clogging of a nozzle may be such that the purge and repressurization operation described above is not adequate to fully unclog the system. In those situations, the valve 52 for the riser connected to the lateral which is clogged or the lateral containing clogged nozzles may be fully opened and either a flexible reaming device or brush may be passed through the riser into the lateral to loosen the caked media so that it may be removed during a subsequent purge. Alternatively, a hose may be snaked into the riser to an appropriate position to direct high pressure water or other fluid into the lateral to clear the clog or some other suitable implement may be manipulated through the open end 34 of the riser and the riser to the lateral to clear the clogs.

The important thing is that an easily accessible access port is provided to the laterals and nozzles to permit clogs to be cleared without requiring removal of the media bed.

While the invention has been described above with respect to a preferred embodiment, it is apparent that with a suitable design of the risers 30, inlet 15 could be brought in at the bottom of the tank and pipe 11 eliminated. Similarly, in a suitable system, pipe 11 might be sufficient to maintain fluid flow and pressure during media settling without risers 30. However, the removal of risers 30 would eliminate the advantages provided by these risers in terms of purging media from the laterals and permitting access to the laterals and nozzles without removal of the media bed for the removal of clogs. Further, while a particular reactor configuration has been shown in the Figures, it is apparent that the teachings of this invention could be utilized with other reactor configurations. Further, while specific dimensions have been provided in some instances, these dimensions are by way of illustration only and the dimensions would vary with the system utilized. Finally, while two techniques have been disclosed for providing a fluid channel or reserve which can flow back into the distribution network when inlet fluid pressure is removed, other configurations for providing such column or reserve of fluid might also be employed. Thus, while the invention has been particularly shown and described above with reference to a preferred embodiment, the foregoing and other changes in form and detail may be made therein by one skilled in the art without departing from the spirit and scope of the invention.

What is claimed is:

1. A fluidized bed reactor for filtering fluids comprising:
    a reactor tank defining a volume;
    a media bed disposed within said tank to a selected level;
    a fluid inlet to said tank;
    a distribution network connected to receive fluid from said inlet and having outlet ports for distribution of the fluid through the media bed;
    a fluid outlet from said tank, said outlet maintaining a selected fluid level in the tank, which level is above that of the media; and
    flow means for temporarily maintaining a gravity fed fluid flow through at least a portion of said distribution network after a termination in fluid flow from the fluid inlet.

2. A reactor as claimed in claim 1 wherein said flow means includes at least one riser, each riser extending substantially vertically from a selected portion of said network to a height above said selected fluid level and being connected to receive fluid from said network, fluid normally rising in said risers to a level above said selected fluid level when there is fluid flow to said network.

3. A reactor as claimed in claim 2 wherein said distribution network includes a plurality of spaced lateral tubes, each having a plurality of spaced ports, and wherein there is at least one riser extending from each of said lateral tubes.

4. A reactor as claimed in claim 3 wherein said network includes a main conduit connected to receive fluid from said fluid inlet, and a plurality of lateral tubes extending from opposite sides of said conduit for a selected length, and wherein the riser extending from each lateral tube extends from a point on the tube near the end of the selected length.

5. A reactor as claimed in claim 3 including an opening near the top end of each riser, and valve means for normally closing said openings, said valve means, when open, permitting purging of at least a portion of the network through the corresponding opening.

6. A reactor as claimed in claim 3 including a small orifice near the top end of each riser.

7. A reactor as claimed in claim 1 wherein said fluid inlet enters said tank at a level above said selected fluid level, and wherein said flow means includes a pipe connecting said fluid inlet to said distribution network, and vacuum breaker means operative after said termination of fluid flow for permitting fluid in said pipe to flow into said distribution network.

8. A reactor as claimed in claim 6 wherein said flow means further includes at least one riser, each riser extending substantially vertically from a selected portion of said network to a height above said selected fluid level and being connected to receive fluid from said network, fluid normally rising in said risers to a level above said selected fluid level when there is fluid flow to said network.

9. A reactor as claimed in claim 1 wherein said flow means includes means for providing at least one column of fluid connected to and extending above said distribution network, the height of each of said fluid columns being greater than said selected fluid level in said reactor; and
    means for permitting each column of fluid to flow into the distribution network after said termination of fluid flow.

10. A method for inhibiting clogging of the fluid distribution network of a fluidized bed reactor comprising the steps of:
    providing at least one column of fluid connected to and extending above said distribution network, the height of each of said fluid columns being greater than the fluid level in said reactor; and
    permitting each column of fluid to flow into the distribution network in the event there is a termination of normal fluid flow to said network.

11. A method as claimed in claim 10 including the step of providing a vacuum breaker for each column at least when said termination of normal fluid flow occurs.

12. A method as claimed in claim 11 wherein said method includes the step of purging the network of media which has entered the network from the fluidized bed.

13. A method as claimed in claim 12 wherein said providing step includes providing at least one riser extending from the network, which riser is normally sealed at its upper end, and said purging step includes the step of opening the sealed end of the riser, permitting a quantity of fluid from the riser and the network to gush out through the resulting opening.

14. In a fluidized bed reactor of a type having a tank containing a media bed to a selected level through which fluid is to be passed for filtering, and a fluid outlet which at least in part maintains a selected fluid level in the tank, which level is above the selected media level, the improvement comprising a distribution system comprising:
    a fluid inlet to said tank;
    a distribution network connected to receive fluid from said inlet and having outlet ports for the distribution of the fluid through the media bed;

means for maintaining at least one fluid reserve, each of said reserves being positioned over a selected portion of said network at a level above said selected fluid level; and means for permitting said reserves to flow into at least the corresponding selected portion of the network after a termination in fluid flow from said fluid inlet.

* * * * *